United States Patent
Tiana et al.

(10) Patent No.: US 10,304,242 B1
(45) Date of Patent: May 28, 2019

(54) TRANSPARENT DISPLAY TERRAIN REPRESENTATION SYSTEMS AND METHODS

(71) Applicant: Rockwell Collins, Inc., Cedar Rapids, IA (US)

(72) Inventors: Carlo L. Tiana, Portland, OR (US); Weston J. Lahr, Sherwood, OR (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 0 days.

(21) Appl. No.: 15/589,697

(22) Filed: May 8, 2017

(51) Int. Cl.
| | |
|---|---|
| *G06T 17/05* | (2011.01) |
| *G06T 19/00* | (2011.01) |
| *G06T 7/11* | (2017.01) |
| *G06T 15/20* | (2011.01) |
| *G06F 16/29* | (2019.01) |
| *G06T 17/00* | (2006.01) |
| *G06T 7/60* | (2017.01) |
| *G02B 27/01* | (2006.01) |
| *G01C 23/00* | (2006.01) |
| *B64D 43/00* | (2006.01) |

(Continued)

(52) U.S. Cl.
CPC .............. *G06T 17/05* (2013.01); *B64D 43/00* (2013.01); *G01C 23/005* (2013.01); *G02B 27/0101* (2013.01); *G06F 16/29* (2019.01); *G06F 16/56* (2019.01); *G06F 16/5866* (2019.01); *G06F 16/9537* (2019.01); *G06T 7/11* (2017.01); *G06T 7/60* (2013.01); *G06T 15/20* (2013.01); *G06T 19/006* (2013.01); *G02B 2027/014* (2013.01); *G06T 2207/10028* (2013.01); *G06T 2207/10044* (2013.01); *G06T 2207/30181* (2013.01); *G06T 2210/56* (2013.01)

(58) Field of Classification Search
CPC .................... G06T 15/00; G06T 17/00; G06T 2207/20012; G06T 2207/30181; G06T 2210/56; G06T 7/11; G06T 7/60; G06T 17/05; G06T 19/006; G06T 15/20; G01C 21/005; G01C 23/005; G06F 17/30241; G06F 16/29; G06F 16/56; G06F 16/5866; G06F 16/9537; G02B 27/0101; B64D 43/00

See application file for complete search history.

(56) References Cited

U.S. PATENT DOCUMENTS

| | | | |
|---|---|---|---|
| 2014/0016857 A1* | 1/2014 | Richards | ................ G06T 7/55 382/154 |
| 2015/0081252 A1* | 3/2015 | Loss | .................. G06F 17/5004 703/1 |
| 2017/0243404 A1* | 8/2017 | Morales | .................... G06T 5/30 |

* cited by examiner

*Primary Examiner* — Kenny A Cese
(74) *Attorney, Agent, or Firm* — Donna P. Suchy; Daniel M. Barbieri

(57) ABSTRACT

A system includes a database and a representation engine. The database stores point cloud data including an indication of elevation of terrain. The representation engine is configured to determine a plurality of regions associated with the point cloud data. The representation engine is configured to identify, for each of the plurality of regions, a first point cloud data point having an elevation that is a local maximum for the corresponding region. The representation engine is configured to calculate, for a plurality of viewpoints corresponding to the point cloud data, a series of vectors connecting first point cloud data points located within a distance threshold of a search distance from each viewpoint. The representation engine is configured to output a terrain database storing the plurality of viewpoints associated with the corresponding series of vectors.

12 Claims, 9 Drawing Sheets

(51) Int. Cl.
*G06F 16/56* (2019.01)
*G06F 16/58* (2019.01)
*G06F 16/9537* (2019.01)

TRANSPARENT DISPLAY TERRAIN REPRESENTATION SYSTEMS AND METHODS

BACKGROUND

The inventive concepts disclosed herein relate generally to the field of transparent displays. More particularly, embodiments of the inventive concepts disclosed herein relate to compact transparent display terrain representation.

Existing display systems for rendering terrain information for display on an aircraft use complex three-dimensional terrain datasets, which may be rendered from collections of point clouds representing latitude, longitude, and elevation of terrain locations. As the resolution of sampling of terrain increases with more accurate instruments (e.g., centimeter resolution sampling with LIDAR-based devices), digital storage requirements for large terrain databases may increase in kind, which may make it difficult for the terrain information to be effectively stored and rendered on avionics hardware conforming to regulatory requirements for size, weight, or energy demand. Existing vision systems, such as synthetic vision systems, may use complex point cloud data for rendering shaded terrain representations. However, when applied to transparent displays, the shaded terrain representations may occlude underlying features on which the shaded terrain representations are overlaid.

SUMMARY

In one aspect, the inventive concepts disclosed herein are directed to a system including a database and a representation engine. The database stores point cloud data including an indication of elevation of terrain. The representation engine is configured to determine a plurality of regions associated with the point cloud data. The representation engine is configured to identify, for each of the plurality of regions, a first point cloud data point having an elevation that is a local maximum for the corresponding region. The representation engine is configured to calculate, for a plurality of viewpoints corresponding to the point cloud data, a series of vectors connecting first point cloud data points located within a distance threshold of a search distance from each viewpoint. The representation engine is configured to output a terrain database storing the plurality of viewpoints associated with the corresponding series of vectors.

In a further aspect, the inventive concepts disclosed herein are directed to a platform including a position sensor, a terrain database, a display engine, and a display device. The position sensor is configured to output an indication of a position and an orientation. The terrain database includes a plurality of viewpoints associated with a corresponding series of vectors. The display engine is configured to retrieve a series of vectors based on the indication of position and orientation and generate an image based on the series of vectors. The display device is configured to display the image.

In a further aspect, the inventive concepts disclosed herein are directed to a method. The method includes determining a plurality of regions associated with point cloud data, the point cloud data including an indication of elevation of terrain. The method includes identifying, for each of the plurality of regions, a first point cloud data point having an elevation that is a local maximum for the corresponding region. The method includes calculating, for a plurality of viewpoints corresponding to the point cloud data, a series of vectors connecting first point cloud data points located within a distance threshold of a search distance from each viewpoint. The method includes outputting a terrain database storing the plurality of viewpoints associated with the corresponding series of vectors.

In a further aspect, the inventive concepts disclosed herein are directed to a method. The method includes receiving an indication of a position and an orientation. The method includes retrieving a series of vectors from a terrain database based on the indication of position and orientation, the terrain database including a plurality of viewpoints associated with a corresponding series of vectors. The method includes generating an image based on the series of vectors. The method includes displaying the image.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
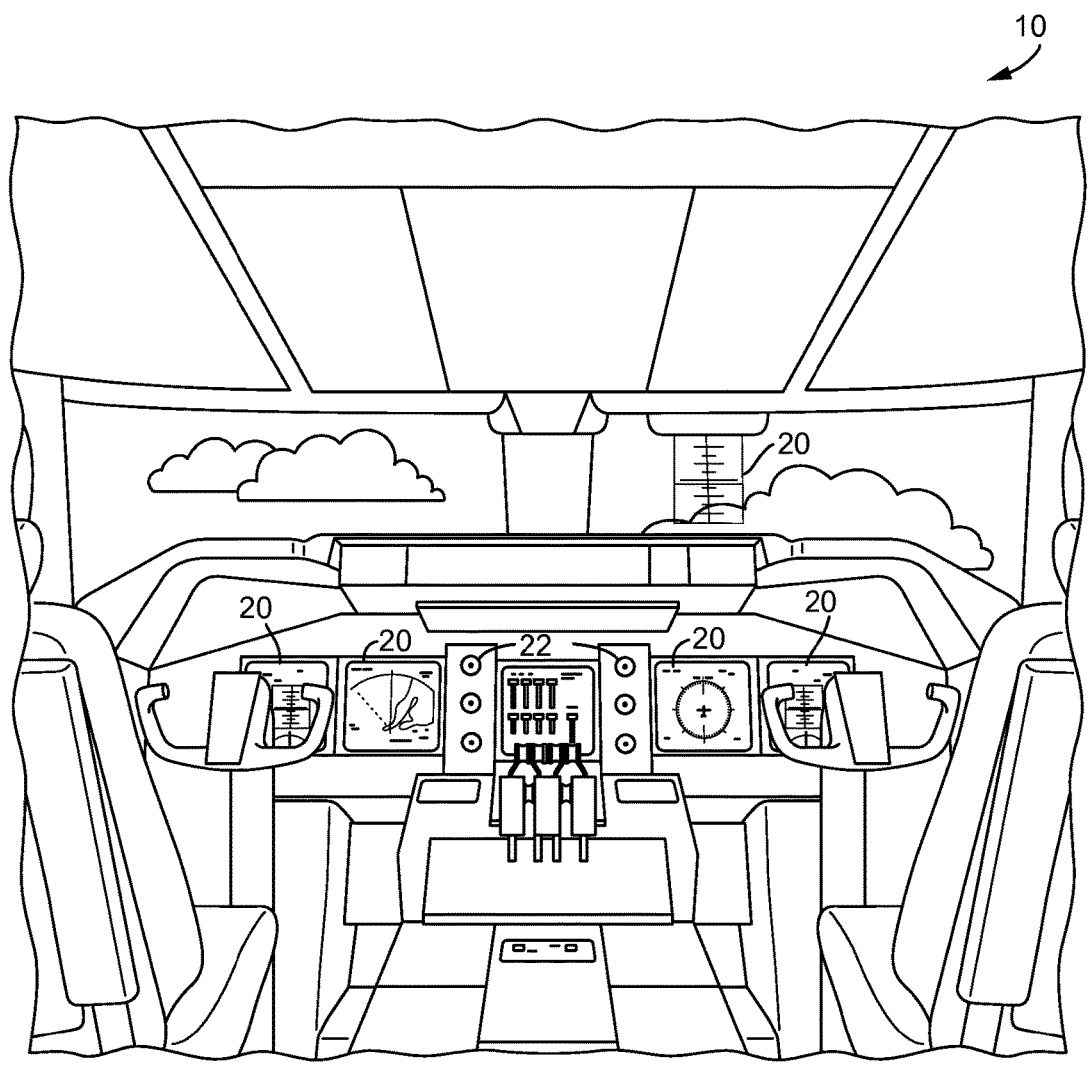
FIG. 1A is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for compact and/or sparse terrain representation, such as for rendering images to be used with transparent displays. The inventive concepts disclosed herein can be utilized in a number of display devices and systems for airborne platforms (e.g., aircraft), including but not limited to flight control and autopilot systems, navigation systems, and flight display systems. While the present disclosure describes systems and methods implementable for an airborne platform, the inventive concepts disclosed herein may be used in any type of environment (e.g., in another aircraft, a spacecraft, a remotely-operated vehicle, a ground-based vehicle, automobile, or other moving platform, or in a non-vehicle application such as a ground-based display system, an air traffic control system, a radar system, a virtual display system, an ocean-going vessel). The inventive concepts disclosed herein can be applied to transparent displays, such as a head-worn display ("HWD") or head up display ("HUD"). While various inventive concepts are described herein with reference to terrain information, it will be appreciated that the inventive concepts disclosed herein may also be applied to generating images associated with buildings or other non-terrain structures, bodies of water, tactical or strategic information, or other information which may be displayed using transparent displays.

In some embodiments, a system includes a database and a representation engine. The database stores point cloud data including an indication of elevation of terrain. The representation engine is configured to determine a plurality of regions associated with the point cloud data. The representation engine is configured to identify, for each of the plurality of regions, a first point cloud data point having an elevation that is a local maximum for the corresponding region. The representation engine is configured to calculate, for a plurality of viewpoints corresponding to the point cloud data, a series of vectors connecting first point cloud data points located within a distance threshold of a search distance from each viewpoint. The representation engine is configured to output a terrain database storing the plurality of viewpoints associated with the corresponding series of vectors.

Systems manufactured in accordance with the inventive concepts disclosed herein can improve operation of vehicles and transparent displays on vehicles (e.g., airborne platforms) by reducing computational, communications bandwidth, and memory requirements for rendering and displaying terrain information, while tailoring the visual look of the rendered terrain to transparent display applications, improving the pilot experience.

Referring to FIG. 1A, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UP") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, HUDs with or without a projector, head up guidance systems, wearable displays, watches, Google Glass® or other HWD systems. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, a sensor system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may receive image information, such as a visualization generated based on an indication of a runway surface condition, and display the image information.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 1B:
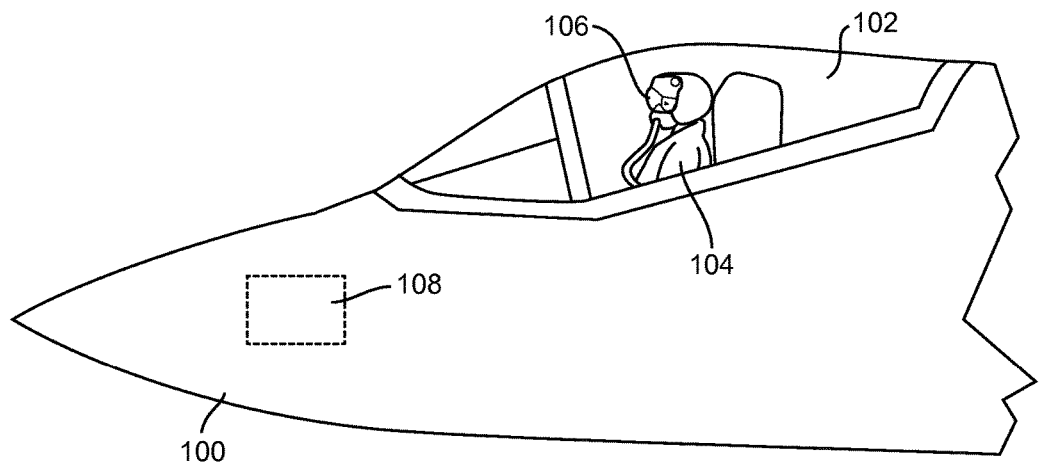
FIG. 1B is a schematic illustration of an exemplary embodiment of a nose portion of an aircraft having a cockpit occupied by a pilot wearing a head-worn display according to the inventive concepts disclosed herein.

Referring now to FIG. 1B, a schematic illustration of a nose portion of an aircraft 100 having a cockpit 102 occupied by a pilot 104 wearing a HWD 106 is shown according to the inventive concepts disclosed herein. The pilot 104 uses the HWD 106 to receive and view information related to the operation of the aircraft 100. The HWD 106 receives the information from an image delivery system 108 located remotely from the HWD 106. The image delivery system 108 may be a system located within the aircraft 100 configured to receive an input from one or more sensors or vision systems of the aircraft 100. The image delivery system 108 may process the inputs and provide the HWD 106 with imagery (e.g., images, symbols, and other display information or features. The HWD 106 may be configured to provide imagery in any type of format. The HWD 106 may be configured to provide two-dimensional or three-dimensional imagery. The type of display used with the HWD 106 is in no way limited. While FIG. 1A describes the use of a HWD, it will be appreciated that the features described with reference to FIG. 1A may also be applied to a HUD.

The HWD 106 may receive images processed by an image processing circuit located remote from the HWD 106. The image processing circuit may receive inputs from the sensors and vision systems of the aircraft 100. For example, in some embodiments, the image delivery system 108 receives inputs from a sensor of the aircraft 100 and processes the inputs before communicating processed images to the HWD 106. In some embodiments, the HWD 106 requires fewer components to display images when image inputs are processed remote from the HWD 106 (e.g., at the image delivery system 108) and then delivered to the HWD 106 instead of processing the image inputs with equipment on the HWD 106 itself. Such arrangements minimize hardware components required by the HWD 106 and may further reduce the electric power and computational power needed to operate the HWD 106. In some embodiments, the HWD 106 may be configured to receive imagery from the image delivery system 108 and to render the imagery on the display without further processing the imagery, while in other embodiments the HWD may be configured to further process the received imagery before the imagery is displayed.

Figure 1C:
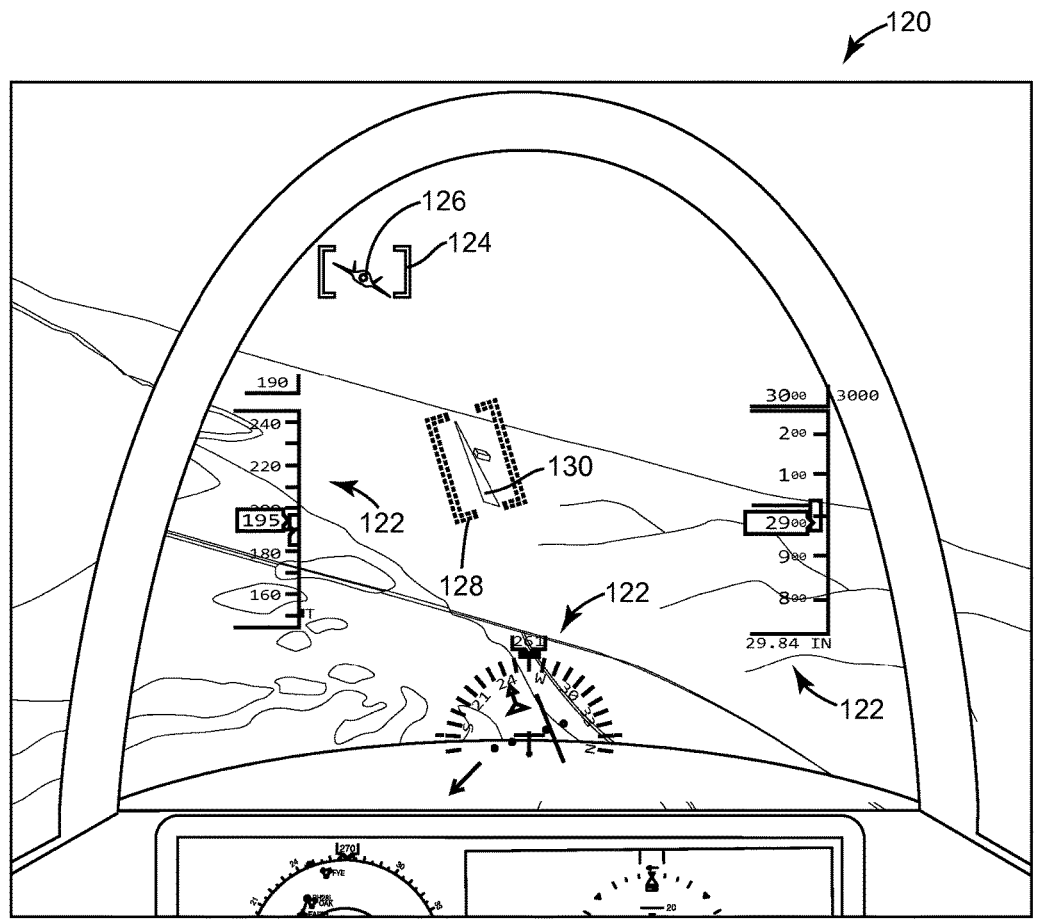
FIG. 1C is an exemplary viewpoint of the pilot through the head-worn display of FIG. 1.

Referring now to FIG. 1C, a perspective view of an example viewpoint 120 of the pilot 104 through the HWD 106 is shown according to the inventive concepts disclosed herein. The display screen of the HWD 106 may be fully transparent or semi-transparent to enable the pilot 104 to view a scene along with display information. In one embodiment, the display information includes screen-referenced imagery 122. For example, the screen-referenced imagery 122 may include information relating to the aircraft's position, speed, altitude, and heading, weather information, or any other information displayed in a fixed position on the display screen. The display information may include aircraft-referenced imagery 124 (e.g., a target indicator for a weapons system that indicates the position of a target 126 with reference to the aircraft 100). The display information may include earth-referenced imagery 128 (e.g., objects of interest based on the object's known location on earth, such as a runway 130).

Figure 2:
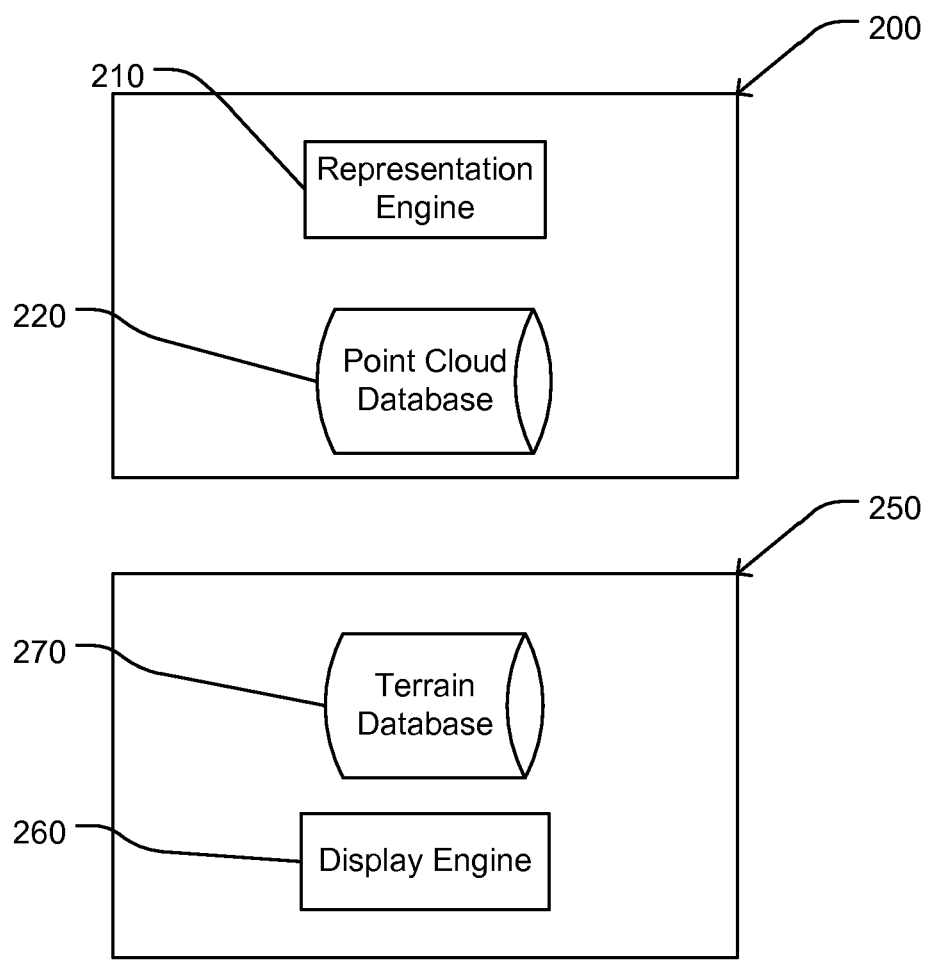
FIG. 2 is a block diagram of an exemplary embodiment of a system for compact terrain representation for transparent displays according to the inventive concepts disclosed herein.

Referring now to FIG. 2, a block diagram of an exemplary embodiment of a system 200 for compact terrain representation is shown according to the inventive concepts disclosed herein. The system 200 includes a terrain representation system 200 and a display system 250. The terrain representation system 200 and display system 250 may include processing hardware (e.g., processors and memory devices) configured to execute the functions described herein. For example, one or both of the terrain representation system 200 and display system 250 can include a processing circuit include a processor and a memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory can include various circuits, software engines, and/or modules that cause the processor to execute the systems and methods described herein.

While in some embodiments the processing circuit includes a single processor, in various embodiments, the processing circuit can include various numbers or arrangements of processors. For example, the processor can be a multi-core processor. The processor can include a plurality of processors that may be dedicated to different tasks. The processing circuit can include the processor as well as a graphics processing unit (GPU); the GPU may be configured to retrieve (or be controlled by the processor to retrieve) electronic instructions for generating an image (e.g., an image generated by display system 250) and execute the electronic instructions in order to generate the image.

The terrain representation system 200 includes a representation engine 210 and a point cloud database 220. The representation engine 210 is configured to generate a representation of terrain, such as a vector-based representation. The point cloud database 220 is configured to store point cloud data associated with terrain. The point cloud data can include an elevation associated with geographic coordinates. The point cloud data can be a grid of terrain data. For example, each data point in the point cloud database 220 may include an elevation value may be associated with corresponding latitude and longitude values. In existing systems, the point cloud database 220 may be used to render a relatively information-dense representation of terrain data, such as a mesh of gridpoints requiring storage of latitude, longitude, and elevation, which must be connected into surface primitives, such as for rendering by vision systems.

The terrain representation system 200 is configured to generate a terrain database. The terrain database may be sparse and/or compact. The terrain database may be sparse by selectively including only the most relevant terrain information (e.g., terrain information for an data points having an elevation greater than an elevation threshold). The terrain database may be compact by reducing the amount of data required to represent terrain features as compared to a point cloud representation (e.g., by using vectors instead of surfaces to represent terrain features). For example, the terrain database may have a lesser storage requirement than the point cloud database 220. The terrain database may include sufficient information to enable a platform using the terrain data to provide a realistic or useful representation of terrain on a HUD or HWD, yet have a relatively low information density such that avionics hardware meeting regulatory requirements for the platform can effectively store the terrain database. By using the representation engine 210 to generate the terrain database, the terrain representation system 200 can enable compressing or pre-rendering terrain information to a format conforming to regulatory requirements for processing hardware for avionics systems.

In some embodiments, the representation engine 210 is configured to generate the terrain database. The representation engine 210 can determine a plurality of regions associated with the point cloud data. Each region may be associated with a plurality of data points (e.g., a plurality of points having longitude, latitude, and elevation values). The regions may have a grid shape (e.g., square, rectangle, hexagon, other polygon). The representation engine 210 can determine the plurality of regions based on a region size. The region size can be a measure of region size such as edge length, radius, diameter, perimeter, maximum distance (e.g., a maximum distance between any two points of edges of the region). The region size may be predetermined or may be adjusted while the regions are generated or after the regions are generated. It will be appreciated that edge points of adjacent regions may be part of each of the adjacent regions. In some embodiments, the representation engine 210 is configured to generate a list of point cloud data points associated with each region.

In some embodiments, the representation engine 210 is configured to store positional relationships between regions. For example, the representation engine 210 can store a map of the regions which may include indications of where regions are adjacent to one another. A first region may be adjacent to a second region of the first region and second region share at least one point cloud data point. The map may be generated based on a shape of the regions. For example, where the regions are generated as four-sided shapes in a region grid (e.g., rectangular shapes matching latitude and longitude-based gridding), the map can indicate, for each region, adjacent regions to the north, south, east, and west. The map might also indicate the regions to the southeast, southwest, northeast, and northwest, as each of these regions may share a respective corner point with the origin region.

The representation engine 210 can identify, for each of the plurality of regions, a first point cloud data point. The first point cloud data point may be a longitude/latitude pair with a corresponding elevation. A plurality of candidate first point cloud data points may be retrieved from the point cloud database 220 for each region. The first cloud data point can be determined based on an elevation of the first cloud data point. For example, the elevation of the identified data point can be the point having a local maximum elevation for the corresponding region. The representation engine 210 can be configured to identify multiple local elevation maxima points for a corresponding region. The representation engine 210 can be configured to identify local elevation maxima points up to a predetermined number of data points, or having an elevation greater than an elevation threshold.

A point cloud data point may be determined to be a local maximum if the elevation of the point cloud data point is greater than that of each adjacent point cloud data point. For example, the point cloud database 220 may represent point cloud data points as a two-dimensional grid (e.g., based on longitude and latitude) with elevation values assigned to each grid point. Point cloud data points may be adjacent where they are apart by one dimensional unit in the two-dimensional grid (e.g., apart by one unit of longitude; apart by one unit of latitude), such that each point cloud data point in a Cartesian grid may have four adjacent point cloud data points.

In some embodiments, the representation engine 210 is configured to identify the first point cloud data point based on an elevation threshold. For example, the representation engine 210 can compare each point cloud data point in each region to the elevation threshold to identify those point cloud data points having an elevation greater than or equal to the elevation threshold, and identify the first point cloud data point as having the greatest elevation among the data points having an elevation greater than or equal to the elevation threshold. The representation engine 210 may also identify a plurality of data points having elevations greater than or equal to the elevation threshold for each region.

The representation engine 210 can calculate one or more vectors connecting first point cloud data points. Each vector can include a direction and magnitude. The direction may be based on a unit vector. The vectors can be calculated to connect first point cloud data points of adjacent regions. For example, where regions of the terrain database are rectangular, a first point cloud data point of an origin region may be connected by a vector to each of the first point cloud data points of regions to the north, northeast, east, southeast, south, southwest, west, and northwest. The vectors may also be calculated to connect first point cloud data points based on a distance threshold. The distance threshold may be determined based on a size associated with the regions. For example, the distance threshold may be equal to or similar in magnitude (e.g., two times, three times) to a maximum length associated with each region, such that vectors are calculated to connect first point cloud data points of adjacent or other nearby regions. In some embodiments, the distance threshold is associated with a number of regions away from an origin region (e.g., two regions away; three regions away).

The representation engine 210 can calculate a series of vectors connecting first point cloud data points. The series of vectors can connect first point data points according to a connection policy or a connection threshold. The connection policy can include identified first point cloud data points located within a distance threshold of a search distance from a viewpoint. The viewpoint may be a point of view similar to what may be experienced by a platform, a vision system, or a pilot (e.g., viewpoint 120 shown with respect to FIG. 1C). The viewpoint may be a vector associated with at least one of a position, orientation, or velocity of a platform (e.g., a viewpoint may correspond to a trajectory or direction of travel of a platform). The series of vectors may form a ridgeline connecting ridges of terrain features such as mountains.

In some embodiments, the series of vectors (e.g., the ridgeline) may indicate a minimum safe elevation at which an aircraft may fly. The ridgeline may be generated as a vector extending at the local maximum elevation from the first point cloud data point to an edge of the corresponding region.

While a plurality of elevations, and thus a corresponding plurality of viewpoints, may be associated with each longitude/latitude pair, the representation engine 210 may treat each viewpoint associated with longitude/latitude pair as a single viewpoint for calculating a series of vectors. In other words, for a given longitude/latitude pair, a terrain feature (e.g., a peak having a local maximum elevation) may be included in one series of vectors associated with the longitude/latitude pair.

The search distance may be associated with an expected visual range. For example, if the visual range of a vision system, a platform, or a pilot is a known distance (e.g., in miles), the search distance may be the known distance, such that series of vectors may be preferentially calculated for each viewpoint to fall within the visual range. The distance threshold may provide a tolerance on either side of a range defined by the search distance, so that every first point cloud data point included in a series of vectors need not be exactly the search distance away from the corresponding viewpoint. In some embodiments, the series of vectors may form a complete arc-like chain around the corresponding viewpoint, such that a last vector in the series connects to a first vector. In some embodiments, one or both ends of a series of vectors may terminate at ground level or at sea level. In some embodiments, a series of vectors may include ground level or sea level data points (and thus may form a complete are even if some of the data points are at or close to zero elevation).

The representation engine 210 can sort the first point cloud data points (e.g., based on latitude and longitude) to order the first point cloud data points, which may facilitate calculating the series of vectors based on connecting adjacent first point cloud data points (even if the representation engine 210 has not generated a map indicating which regions are adjacent to one another).

The representation engine 210 can calculate the series of vectors for each viewpoint. For example, for each longitude/latitude pair, one or more series of vectors may be calculated. The series of vectors may represent a sparse and/or compact visualization of how the terrain associated with the first point cloud data points might appear from the viewpoint.

The terrain representation system 200 can output the generated terrain database, such as to be stored in the terrain database 270 of the display system 250. The generated terrain database can be outputted as the plurality of viewpoints associated with a corresponding series of vectors. The terrain database 270 can store search distances associated with each series of vectors, which can facilitate retrieving appropriate series of vectors based on a known visual range of a platform.

In some embodiments, the representation engine 210 is configured to associate a database key with each viewpoint. The database key can correspond to an output from at least one of a vision system or a position sensor. For example, the database key may be geographical coordinates (e.g., latitude and longitude) which may be compared to the stored viewpoints in the terrain database 270, which can facilitate retrieving appropriate series of vectors in real time when the series of vectors are used to generate an image of terrain identified by the vision system or position sensor.

In some embodiments, the representation engine 210 is configured to generate the terrain database based on a gradient between point cloud data points. The representation engine 210 can generate subregions of existing regions based on the gradient. The representation engine 210 can adjust how regions are generated based on the gradient. The representation engine 210 can modify a size parameter associated with region generation based on the gradient. The representation engine 210 can decrease a size for region generation (e.g., a perimeter, edge length, radius, diameter, or other measure of region size) based on the gradient being greater than a first threshold value. The representation engine 210 increase can a size for region identification based on the gradient being less than a second threshold value. The second threshold value may be equal to the first threshold value (e.g., if the size of each region is to be modified based on a gradient) or may be less than the first threshold value (e.g., if the size parameter for region generation is to be modified only if the gradient is an outlier compared to typical region sizes when the gradient is greater than the second threshold value and less than the first threshold value). The first threshold value and/or second threshold value may be selected based on size, energy demand, and/or processing power constraints for a platform 300 as described with reference to FIG. 3 further herein. The representation engine 210 may divide existing regions into subregions. The representation engine 210 may expand or contract the borders of existing regions.

The representation engine 210 can be configured to reduce a number of first point cloud data points (or the corresponding vectors) for a plurality of regions. This may make the terrain database more compact and/or sparse, such as by reducing the number of vectors required to represent the terrain corresponding to the plurality of regions. The representation engine 210 can be configured to reduce the number of first point cloud data points based on a gradient between a set of three consecutive (e.g., adjacent) first point cloud data points. For example, the representation engine 210 can compare the elevation of a selected first point data point to an adjacent first point cloud data point on a first side (e.g., to the left) and an adjacent first point cloud data point on a second side (e.g., to the right). If the elevation of the selected first point cloud data point is less than that of both the first side and second side adjacent points, then the representation engine 210 can remove the selected first point cloud data point from the terrain database. The representation engine 210 may additionally or alternatively generate a new vector connecting the first side adjacent point to the second side adjacent point, allowing for the terrain database to store one less vector. As the selected first point cloud data point has a lower elevation than the adjacent point cloud data points, the vector connecting the adjacent point cloud data points will be above any point cloud data point in the region corresponding to the selected first point cloud data point, ensuring that the new vector continues to safely represent the underlying terrain.

In some embodiments, the representation engine 210 is configured to reduce a number of first point cloud data points (or the corresponding vectors) for a plurality of regions based on a gradient between point cloud data points, such as if the gradient indicates a relatively low variation of terrain elevation. For example, if a gradient between two adjacent first point cloud data points is less than a variation threshold, the representation engine 210 can remove the first point cloud data point having a lesser elevation and/or connect any vectors connected to the lower first point cloud data point to the higher point cloud data point. It will be appreciated that reducing first point cloud data points as described herein may greatly facilitate generation of a compact and sparse terrain database. For example, if the regions are arranged in a Cartesian (e.g., rectangular) grid, where each region has vectors connecting to eight adjacent regions (e.g., north, northeast, east, southeast, south, southwest, west, northwest), and the gradient between first point cloud data points for a selected region and each adjacent region is less than the variation threshold, then the number of vectors required to represent the selected region may be reduced by at least a factor of two (e.g., from eight vectors connecting to each of the adjacent regions to four vectors crossing the selected region: north to south, east to west, northeast to southwest, and northwest to southeast).

In some embodiments, the representation engine 210 is configured to dynamically or adaptively update the region size based on the gradient. For example, a gradient can be calculated between a first point cloud data point associated with a first region and a second point cloud data point associated with a second region, and the gradient can be used to determine whether to modify the region size (including dividing the first region or the second region into one or more subregions) prior to identifying a third point cloud data point of a third region.

In some embodiments, the representation engine 210 is configured to execute a first pass of region determination and point cloud data point identification, such as by generating identifying all point cloud data points associated with a plurality of first regions. The representation engine 210 can subsequently calculate (e.g., sample) gradients across one or more pairs of point cloud data points, and determine whether to generate one or more second regions (e.g., subregions, additional regions) based on the calculated gradients. The representation engine 210 may execute a second pass of region determination and point cloud data point identification to identify point cloud data points associated with the one or more second regions. It will be appreciated that the decision of when to generate subregions or additional regions (e.g., based on gradient calculations) may be varied based on factors including a comparison of gradient(s) to threshold values or to a measure of variability; for example, if calculated gradients have a relatively high variability for a set of regions, the representation engine 210 can adopt a more dynamic approach by more frequently calculating gradients, or vice versa. In some embodiments, the representation engine 210 is configured to calculate gradient(s) between a plurality of points across regions, and combine the calculated gradient(s) into a single measure to determine whether to generate additional regions. The representation engine 210 can vary a density of gradient calculation or sampling based on various factors such as previously calculated gradient values, or computational requirements of hardware on which the terrain database 270 is to be loaded.

In some embodiments, the representation engine 210 is configured to generate a plurality of vectors within a region. For example, the representation engine 210 can identify a first set of point cloud data points in a region having an elevation greater than an elevation threshold, and identify a second set of point cloud data points, among the first set, which are each local maxima.

In some embodiments, the representation engine 210 is configured to connect first point cloud data points using Bezier curves. For example, each first point cloud data point may be included as points in a Bezier curve. This may facilitate scaling or other modification to the representation of the first point cloud data points by the graphics engine 260 as described herein.

Figure 3:
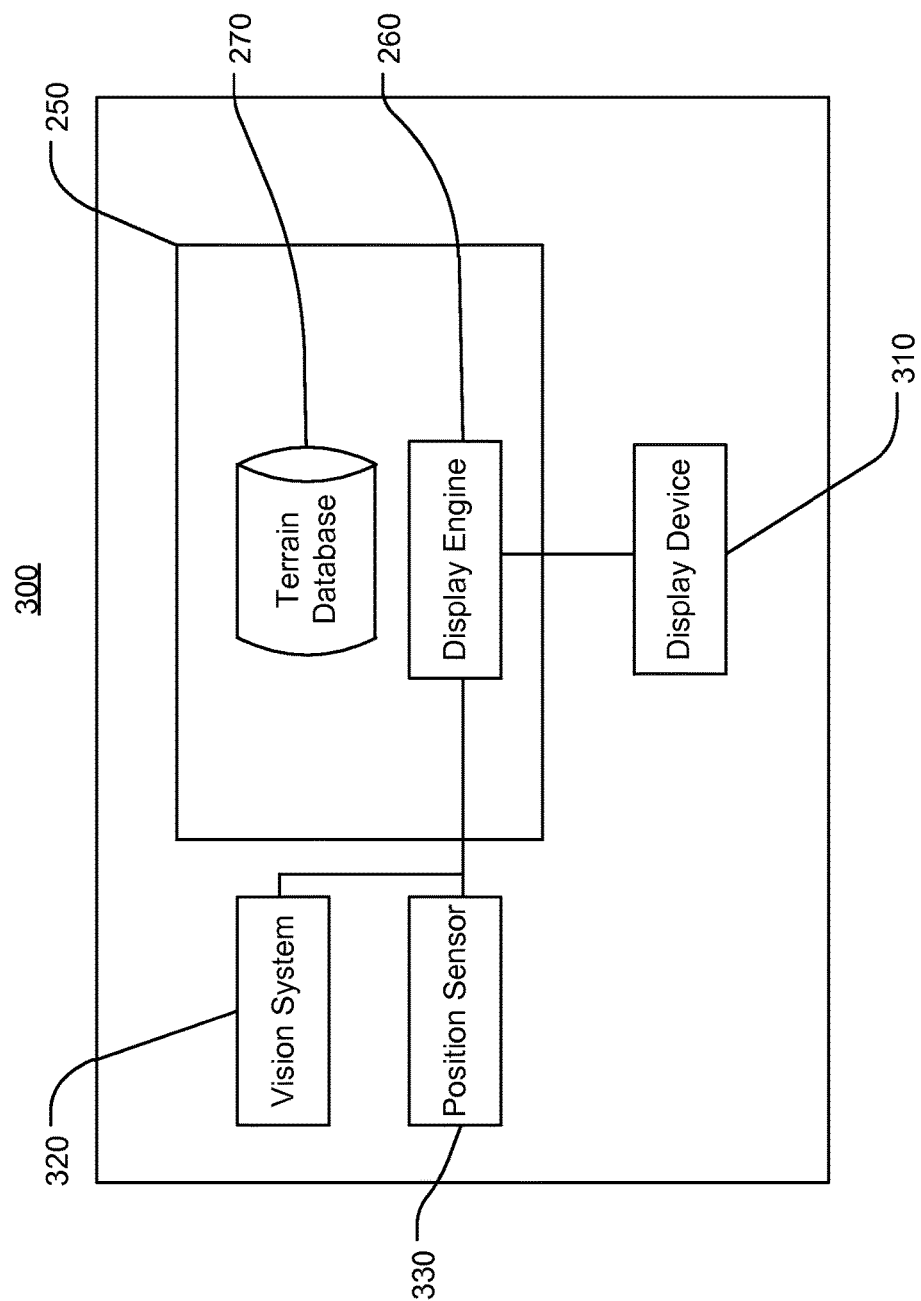
FIG. 3 is a block diagram of an exemplary embodiment of a platform incorporating a terrain database generated according to the inventive concepts disclosed herein.

Referring now to FIG. 3, a block diagram of an exemplary embodiment of a platform 300 is shown according to the inventive concepts disclosed herein. The platform 300 can include the display system 250. For example, the display system 250 can include a terrain database 270, which can include a plurality of viewpoints associated with a corresponding series of vectors.

The display system 250 can include a display engine 260. The display engine 260 can include features of the image delivery system 108 described with reference to FIG. 1A. The display engine 260 is configured to generate images for display by a display device, such as a HWD or a HUD.

The display engine 260 can be configured to retrieve a series of vectors from the terrain database 270. The display engine 260 can generate an image based on the series of vectors. For example, the display engine 260 can generate an image that includes a representation of terrain information consistent with a viewpoint of the platform 300. The display engine 260 can generate the image to include one or more series of vectors associated with terrain features within a visual range of the platform 300. The display engine 260 can generate the series of vectors as a ridgeline associated with terrain ridges.

In some embodiments, the platform 300 includes processing hardware (e.g., processing electronics, avionics hardware) that includes a processor and a memory device steering the terrain database 270 and the display engine 260. The processing hardware can be selected to meet regulatory criteria for aircraft electronics. For example, the processing hardware can be configured to satisfy criteria associated with weight, processing power, or energy demand requirements. The processing hardware can have at least one of a weight, a processing power, or an energy demand that is less than a corresponding threshold determined based on a regulatory requirement.

In some embodiments, the platform 300 includes a display device 310. The display device 310 can include features of the flight displays 20 described with reference to FIG. 1A and/or the HWD 106 described with reference to FIGS. 1B-1C. The display device 310 can be a transparent display. The display device 310 can be an HUD or a HWD. The display device 310 can be configured to overlay an image (e.g., an image generated by display engine 260) on a cockpit window or other device by which a pilot within the platform 300 may view an environment surrounding the platform 300.

In some embodiments, the display device 310 is configured to at least partially generate or render an image. For example, the display device 310 may include a display engine similar to display engine 260 (or having lesser processing capabilities) configured to generate images based on the series of vectors of the terrain database.

In some embodiments, the platform 300 includes a vision system 320. The vision system 320 may be a synthetic vision system ("SVS") or an enhanced vision system ("EVS"), or combined vision system ("CVS"). The vision system 320 can be configured to output a representation of an environment surround the platform 300. The display device 310 can be configured to overlay the image generated by the display engine 260 on the representation of the environment. The vision system 320 can be configured to generate situational awareness information such as runways, airport symbols, trajectory data, navigation and approach data, and other such information. The vision system 320 can be configured to detect sensor data (e.g., from an infrared camera, visible light camera, radar device, LIDAR device) and generate the representation of the environment based on the sensor data.

In some embodiments, the platform 300 includes a position sensor 330. The position sensor 330 is configured to output an indication of at least one of a position or an orientation of the platform 300. The position sensor 330 may be a GPS sensor or may be configured to receive GPS data. The position sensor 330 can be communicatively coupled to include features of a navigation system. The position sensor 330 can be configured to detect the at least one of the position or orientation of the platform 300.

The display engine 260 can generate (e.g., render) the image based on a current position and/or orientation of the platform 300. For example, the display engine 260 can determine a viewpoint associated with the platform based on the current position and/or orientation. The display engine 260 can generate the image to include one or more series of vectors which are closest to orthogonal to the viewpoint (e.g., closest to orthogonal to a current heading of the platform 300 associated with the position and/or orientation of the platform 300). For example, the display engine 260 can retrieve a plurality of series of vectors associated with the determined viewpoint. The display engine 260 can calculate an angle between a velocity vector of the platform 300 and each of the plurality of series of vectors, and select the series of vectors closest to orthogonal (e.g., the series of vectors for which an absolute value of a difference between the angle and ninety degrees is the least). The angle may be calculated in a horizontal plane (e.g., in a plane defined by longitude and latitude coordinates, rather than elevation coordinates).

The display engine 260 can update the image. Updating the image can include adjusting apparent locations and sizes of vectors included in the image. The "apparent" location and/or size may refer to how the vector is represented in the image, which may depend on the viewpoint (even as the underlying data representing the vector as stored in the terrain database 270 remains constant). Updating the image can include removing non-relevant series of vectors (e.g., vectors no longer in a field of view associated with the platform 300) and adding new series of vectors (e.g., adding vectors entering a field of view associated with the platform 300, or vectors having a distance from the viewpoint less than a threshold distance value). The display engine 260 can be configured to update the image based on a refresh rate. In some embodiments, the refresh rate is predetermined (e.g., the refresh rate may be greater than a threshold refresh rate at which a typical human eye can discern individual image frames; the refresh rate may be associated with a specification or performance characteristic associated with the display device 310). In some embodiments, the refresh rate is determined based on movement or an energy state of the platform 300. The refresh rate may be determined as a function of velocity of the platform 300. For example, if the platform 300 moves at a greater speed and/or changes in direction, the refresh rate may be increased to assure that the image updates fast enough to account for the change in velocity.

In some embodiments, the display engine 260 is configured to retrieve the series of vectors based on a current state or expected state of the platform 300, such as an energy state. The state can include or be determined based on parameters such as speed, acceleration, thrust, orientation, heading, or trajectory. The display engine 260 can also be configured to retrieve the series of vectors based on a flight plan or command instructions (e.g., from a leader platform) associated with movement of the platform 300.

The display engine 260 can retrieve a second series of vectors associated with a second viewpoint. The display engine 260 can include the second series of vectors in the same image as a first series of vectors, or can generate a second image including the second series of vectors. The second series of vectors can be retrieved based on an expected state of the platform 300 (e.g., expected location, expected position, expected orientation). In some embodiments, by retrieving a second series of vectors, the display engine 260 may anticipate terrain information to be displayed before it is needed, which can enable a more smooth or fluid transition between displaying the terrain information as the platform 300 moves relative to the surrounding terrain.

The display engine 260 can be configured to generate the image to include a plurality of series of vectors associated with a viewpoint. For example, the image can include a first series of vectors at a first distance from the viewpoint, and a second series of vectors at a second distance from the viewpoint. The display engine 260 can be configured to update the image for display by removing a closest series of vectors for the image and adding a further series of vectors for the image. This can allow the display engine 260 to continuously generate images for display having a relatively high information content while only requiring a single series of vectors to be generated each time the image is updated. In some embodiments, updating the image may include scaling an apparent size of series of vectors which are neither removed nor added when the image is updated. For example, the display engine 260 can be configured to generate the image to include three series of vectors (e.g., ranging from first series closest to the viewpoint to a third series furthest from the viewpoint). When the image is updated, the first series can be removed from the image, the second series scaled up in size to account for a change in distance from the viewpoint to the second series, the third series scaled up in size to account for a change in distance from the viewpoint to the third series (the third series may be scaled up by a scaling factor that is less than what is used for the second series), and a new series furthest from the viewpoint added to the image. The scaling of vectors may be facilitated by representing the terrain information in a vector-based format. Similarly, one or more series of vectors may be shifted in relative location within the updated image to account for a change in position of the viewpoint associated with the platform 300.

In some embodiments, the display engine 260 is configured to output the series of vectors (or an image including the series of vectors) at a communication rate less than a threshold rate for a bandwidth for communicating with the display device 310. For example, a communications link between the display engine 260 and the display device 310, such as a communications bus, a wired connection, a wireless connection, or other communication protocol, may have a constrained bandwidth. The bandwidth may be constrained because of size, weight, or power requirements for the platform 300 or the display device 310. In some applications, such as where the platform 300 travels at a relatively high velocity (e.g., airborne platforms) the bandwidth constraints of the communications link may make it difficult to communicate point cloud data or fully rendered images to the display device 310 at a rate sufficient for the display device 310 to update and display images while the platform 300 is travelling. For example, if the velocity of the platform 300 requires the display device 310 to update the displayed image at a frame rate of 60 Hz in order to maintain an accurate visual representation of the terrain, but the bandwidth constraints of the communications link only allow point cloud data or fully rendered images to be transmitted at a frame rate of 30 Hz, then the visual representation of the terrain will not be accurate or otherwise meet performance requirements. In various embodiments of the inventive concepts disclosed herein, the display engine 260 (using the vectors stored in the terrain database 270 to represent the underlying terrain) may thus improve over existing systems, which may not be able to meet bandwidth constraints because they require outputting point cloud data, by outputting terrain information in a compact and/or sparse format. For example, the display device 310 may be configured to render and display the series of vectors received from the terrain database 270, which may provide a performance advantage as compared to transferring full point cloud data to the display device 310 or transferring a fully rendered image to the display device 310.

Figure 4A:
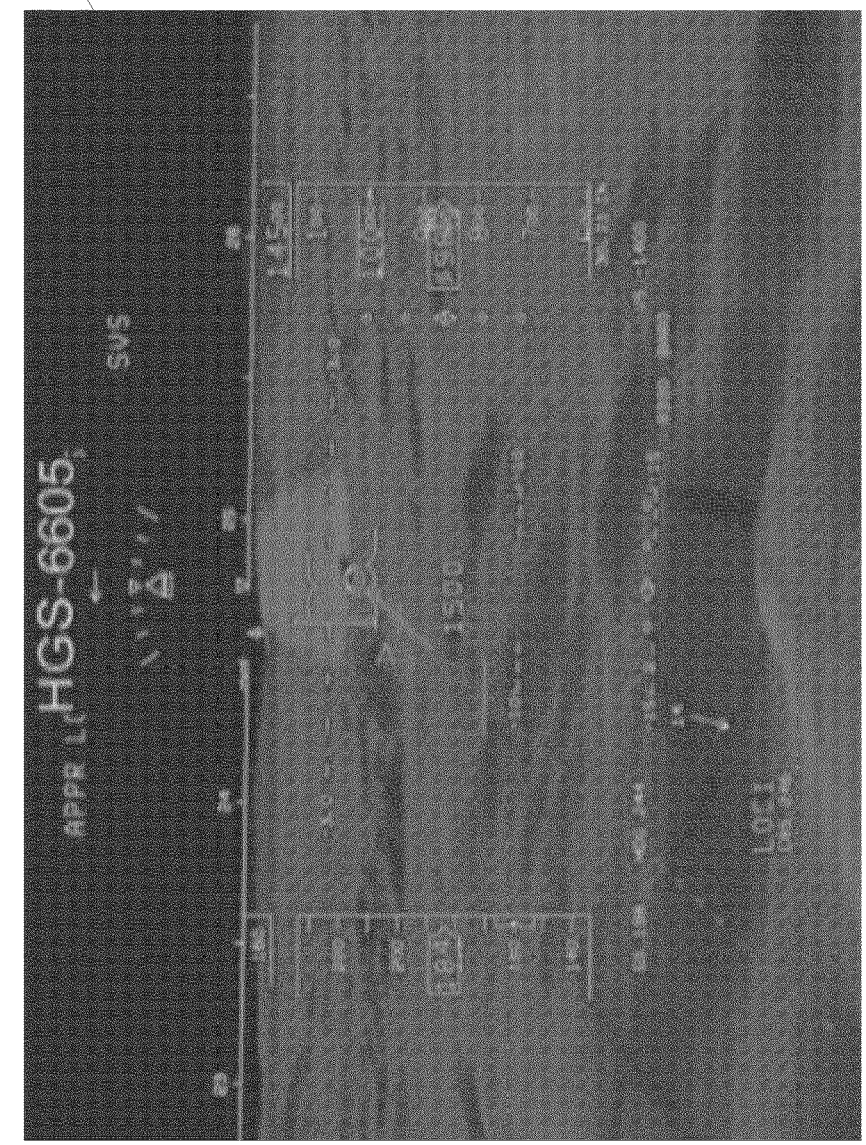
FIG. 4A is a schematic illustration of terrain information displayed by existing systems.
Figure 4B:
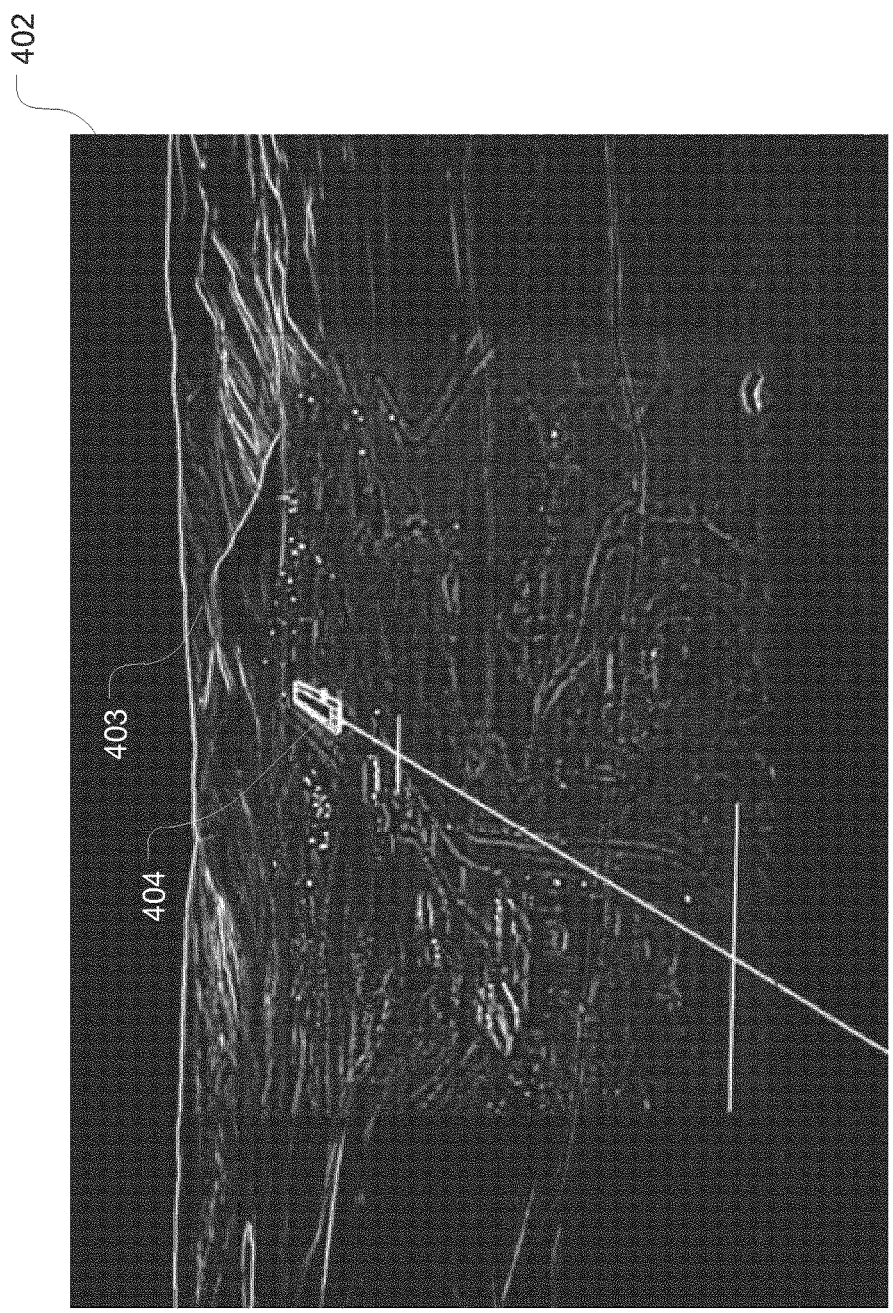
FIG. 4B is a schematic illustration of an exemplary embodiment of a transparent display displaying terrain information according to the inventive concepts disclosed herein.

Referring now to FIGS. 4A-4B, various examples of transparent displays are shown. As shown in FIG. 4A, in existing systems, a terrain awareness and warning system ("TAWS") or SVS may be used to output an image 401 including terrain information. In such applications for transparent displays, such as where the image 401 includes terrain information displayed using surface shading overlaid by the transparent display on an external environment, the image 401 may occlude or obscure the external environment.

As shown in FIG. 4B, in various embodiments according to the inventive concepts disclosed herein, an image 402 may be generated for display by a transparent display. The image 402 is generated to display terrain features using series of vectors 403 as described herein. Unlike existing systems, which may generate terrain information in images such as image 401 shown in FIG. 4A (which require relatively large computational resources to store point cloud data and render the image 401, and which occlude or obscure an external environment otherwise viewable through a transparent display) systems and methods according to the inventive concepts disclosed herein enable a sparse, compact terrain database which can be used to generate the image 402 to display terrain features that allow an external environment to still be visible on the transparent display.

Figure 5:
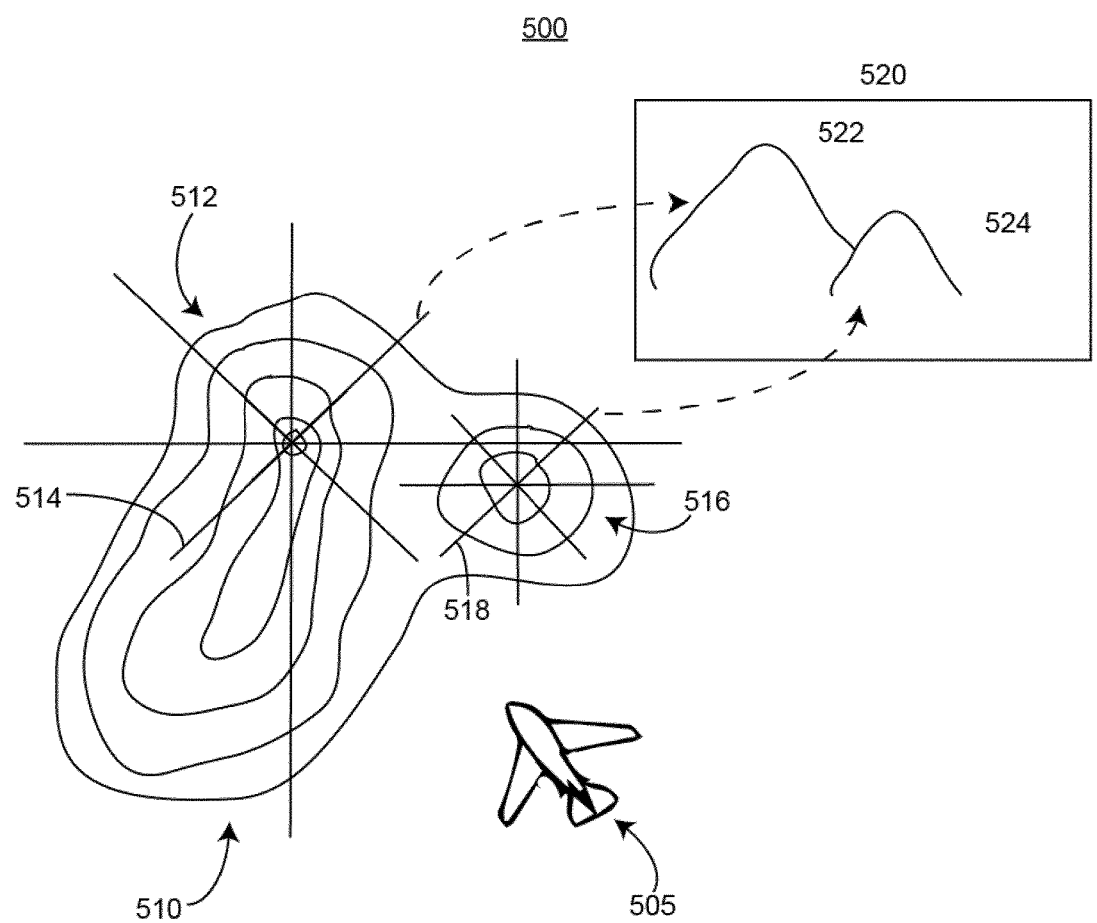
FIG. 5 is a schematic illustration of an exemplary embodiment of a system for displaying terrain information according to the inventive concepts disclosed herein.

Referring now to FIG. 5, a schematic diagram 500 illustrating image generation is shown according to the inventive concepts disclosed herein. A platform 505 (e.g., an aircraft which may incorporate features of the platform 300) is shown to be flying near terrain 510. The terrain 510 includes a first peak 512 and a second peak 516. The platform 505 includes a terrain database storing a series of vectors associated with viewpoints which may correspond to a position and/or orientation of the platform 505. The platform 505 is configured to generate an image 520 of the terrain 510 for displaying on a transparent display. The platform 505 can retrieve the appropriate series of vectors 514 representing the first peak 512, and similarly retrieve the appropriate series of vectors 518 representing the second peak 516. The series of vectors 514, 518 may be retrieved based on a determination that the series of vectors 514, 518 are closest to orthogonal to a viewpoint of the platform 505 (e.g., closest to orthogonal to vector associated with a velocity or direction of travel of the platform 505). The platform 505 is configured to generate the image 520 to include a first representation 522 of the series of vectors 514 representing the first peak 512 (e.g., a first ridgeline) and a second representation 524 of the series of vectors 518 representing the second peak 524 (e.g., a second ridgeline). The platform 505 can be configured to display the image 520 on a transparent display (e.g., a HUD, a HWD) without occluding a view of an external environment on which the image 520 may be overlaid.

Figure 6:
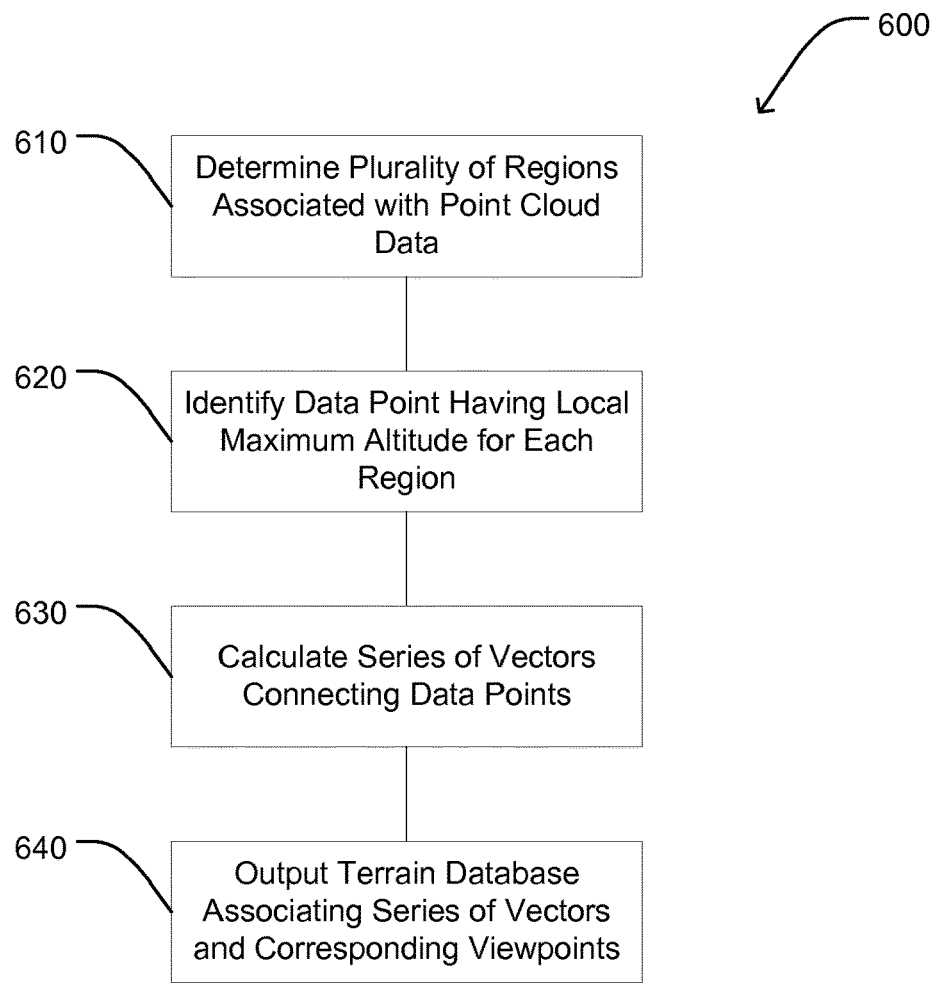
FIG. 6 is a flow chart of an exemplary embodiment of a method for generating a compact terrain database terrain information according to the inventive concepts disclosed herein.

Referring now to FIG. 6, an exemplary embodiment of a method 600 according to the inventive concepts disclosed herein may include the following steps. The method 600 may be performed using various hardware, apparatuses, and systems disclosed herein, such as the cockpit 10, the aircraft 100, the system 200, the platform 300, and/or the platform 500.

A step (610) may include determining a plurality of regions associated with point cloud data. The point cloud data includes an indication of elevation of terrain. The plurality of regions may be determined based on longitude and latitude values associated with data points in the point cloud data. The regions may be determined to have uniform or non-uniform shapes.

A step (620) may include identifying, for each of the plurality of regions, a first point cloud data point having an elevation that is a local maximum for the corresponding region. The local maximum may be determine as the elevation that is greatest amongst all point cloud data points in the region. The region may include one or more local maxima, which may be defined as point cloud data point(s) having a greater elevation than each adjacent point cloud data point. In some embodiments, identifying the first point cloud data point includes determining a point cloud data point to be the first point cloud data point if the elevation of the first point cloud data point is greater than a first elevation threshold.

A step (630) may include calculating, for a plurality of viewpoints corresponding to the point cloud data, a series of vectors connecting first point cloud data points located within a distance threshold of a search distance from each viewpoint. The viewpoints may correspond to a perspective or direction of travel experienced by a platform, such as an aircraft. The search distance may be similar in magnitude to a visual range of a platform. The distance threshold may allow for first point cloud data points which are not exactly the search distance away from the viewpoint to be connected in the series of vectors. In some embodiments, calculating the series of vectors includes calculating each vector to connect adjacent point cloud data points.

A step (640) may include outputting a terrain database storing the plurality of viewpoints associated with the corresponding series of vectors. The terrain database may relatively sparse and/or compact, such as to meet regulatory requirements associated with processing electronics for aircraft. In some embodiments, the method 600 includes associating a database key with each viewpoint, the database key corresponding to an output from at least one of a vision system or a position sensor.

In some embodiments, the method includes identifying additional first point cloud data points based on a gradient between first point cloud data points. For example, the method can include selecting a region, identifying a second point cloud data point adjacent to the first point cloud data point for the region, calculating a gradient between the first point cloud data point and the second point cloud data point, comparing an absolute value of the gradient to a gradient threshold, and, if the absolute value is greater than the gradient threshold, dividing the region into a first subregion and a second subregion, the first subregion including the first point cloud data point, and including the second subregion in the plurality of regions used to identify the first point cloud data points.

In some embodiments, the method 600 includes calculating, for each first point cloud data point, a first vector between the first point cloud data point and an adjacent first point cloud data point in a direction tangential to a circle defined by the distance threshold, and a second vector between the first point cloud data point and an adjacent point cloud data point in a direction perpendicular to the circle.

Figure 7:
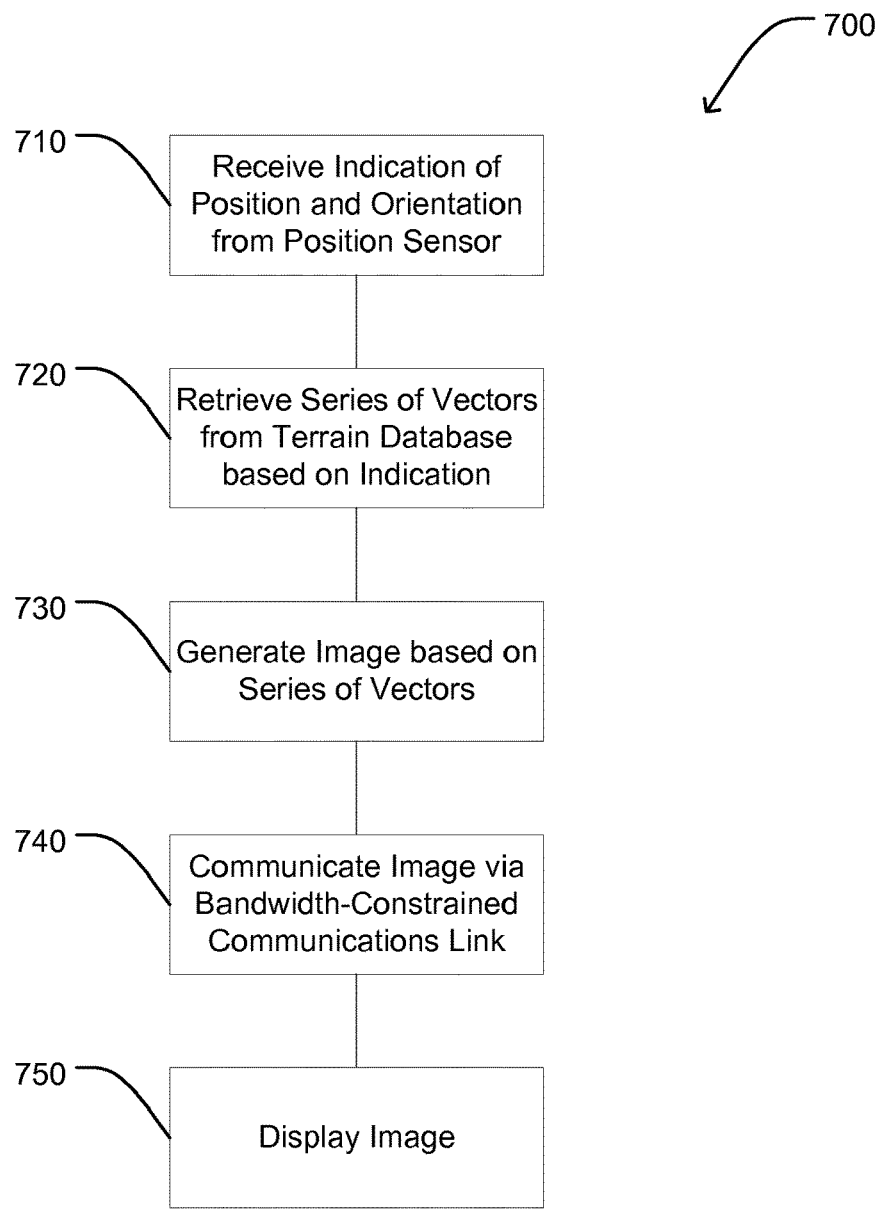
FIG. 7 is a flow chart of an exemplary embodiment of a method for displaying terrain information on a transparent display terrain information according to the inventive concepts disclosed herein.

Referring now to FIG. 7, an exemplary embodiment of a method 700 according to the inventive concepts disclosed herein may include the following steps. The method 700 may be performed using various hardware, apparatuses, and systems disclosed herein, such as the cockpit 10, the aircraft 100, the system 200, the platform 300, and/or the platform 500.

A step (710) may include receiving an indication of a position and an orientation of a platform, such as an aircraft. The position and orientation may be received from a position sensor, such as a GPS sensor. The position and orientation may be received from a navigation system.

A step (720) may include retrieving a series of vectors from a terrain database based on the indication of position and orientation. The terrain database may include a plurality of viewpoints associated with a corresponding series of vectors. The indication of position and orientation may be used to select a viewpoint (e.g., a viewpoint closest to the position and orientation, such that the viewpoint corresponds to an external environment which may be perceived from the platform).

A step (730) may include generating an image based on the series of vectors. The image may be generated such that the series of vectors represent terrain information captured by the first point cloud data points connected by the series of vectors. The image may be generated such that the series of vectors appear as ridgelines. Generating the image may include rendering multiple series of vectors corresponding to the selected viewpoint and arranged at varying distances from the viewpoint.

A step (740) may including communicating (e.g., transmitting, transferring) the image to a display device over a bandwidth-constrained communications link to a display device. The image may be communicated at a communications rate less than a threshold rate corresponding to a bandwidth of the communications link. The communications link may be a communications bus, a wired connection, or a wireless connection. The communications link may be bandwidth-constrained because of size, weight, or power requirements. As compared to existing systems, for which the bandwidth of the communications link may not be sufficient to transfer point cloud data for rendering terrain information, the image generated based on the series of vectors may be compact and/or sparse enough to be communicated over the bandwidth-constrained communications link at a rate sufficient for the display device to display the terrain information as a platform (e.g., airborne platform) moves over the terrain.

A step (750) may include displaying the image on the display device. The display device may be a transparent display, such as a HUD or HWD. The image may be displayed by the transparent display as an overlay on a view of the external environment.

As will be appreciated from the above, systems and methods for compact terrain representation transparent displays according to the inventive concepts disclosed herein may improve operation of aircraft and other platforms incorporating transparent displays by (1) reducing the computational resources needed to effectively transmit terrain information over bandwidth-constrained communications links and render t\he terrain information on transparent displays, such as to ensure that processing electronics on the aircraft meet regulatory requirements associated with size or energy demand limitations; and/or (2) increasing the visual effectiveness and appeal of the transparent displays by displaying terrain information without occluding a view of an external environment.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a database storing point cloud data, the point cloud data including an indication of elevation of terrain; and
a representation engine configured to:
determine a plurality of regions associated with the point cloud data;
identify, for each of the plurality of regions, a first point cloud data point having an elevation that is a local maximum for the corresponding region;
calculate, for a plurality of viewpoints corresponding to the point cloud data, a series of vectors connecting first point cloud data points located within a distance threshold of a search distance from each viewpoint; and
output a terrain database storing the plurality of viewpoints associated with corresponding series of vectors.

2. The system of claim 1, wherein the representation engine is further configured to associate a database key with each viewpoint, the database key corresponding to an output from at least one of a vision system or a position sensor.

3. The system of claim 1, wherein the representation engine is configured to identify the first point cloud data point by determining a point cloud data point to be the first point cloud data point if the elevation of the first point cloud data point is greater than a first elevation threshold.

4. The system of claim 1, wherein the representation engine is configured to calculate each vector to connect adjacent point cloud data points.

5. The system of claim 1, wherein the representation engine is further configured to:
select a region;
identify a second point cloud data point adjacent to the first point cloud data point for the region;
calculate a gradient between the first point cloud data point and the second point cloud data point;
compare an absolute value of the gradient to a gradient threshold; and
if the absolute value of the gradient is greater than the gradient threshold, divide the region into a first subregion and a second subregion, the first subregion including the first point cloud data point, and include the second subregion in the plurality of regions used to identify first point cloud data points.

6. The system of claim 1, wherein the representation engine is further configured to calculate, for each first point cloud data point, a first vector between the first point cloud data point and an adjacent first point cloud data point in a direction tangential to a circle defined by the distance threshold, and a second vector between the first point cloud data point and an adjacent first point cloud data point in a direction perpendicular to the circle.

7. A method, comprising:
determining a plurality of regions associated with point cloud data, the point cloud data including an indication of elevation of terrain;
identifying, for each of the plurality of regions, a first point cloud data point having an elevation that is a local maximum for the corresponding region;
calculating, for a plurality of viewpoints corresponding to the point cloud data, a series of vectors connecting first point cloud data points located within a distance threshold of a search distance from each viewpoint; and
outputting a terrain database storing the plurality of viewpoints associated with the corresponding series of vectors.

8. The method of claim 7, further comprising associating a database key with each viewpoint, the database key corresponding to an output from at least one of a vision system or a position sensor.

9. The method of claim 7, wherein identifying the first point cloud data point includes determining a point cloud data point to be the first point cloud data point if the elevation of the first point cloud data point is greater than a first elevation threshold.

10. The method of claim 7, wherein calculating the series of vectors includes calculating each vector to connect adjacent point cloud data points.

11. The method of claim 7, further comprising:
selecting a region;
identifying a second point cloud data point adjacent to the first point cloud data point for the region;
calculating a gradient between the first point cloud data point and the second point cloud data point;
comparing an absolute value of the gradient to a gradient threshold; and
if the absolute value of the gradient is greater than the gradient threshold, dividing the region into a first subregion and a second subregion, the first subregion including the first point cloud data point, and including the second subregion in the plurality of regions used to identify first point cloud data points.

12. The method of claim 7, further comprising calculating, for each first point cloud data point, a first vector between the first point cloud data point and an adjacent first point cloud data point in a direction tangential to a circle defined by the distance threshold, and a second vector between the first point cloud data point and an adjacent first point cloud data point in a direction perpendicular to the circle.

* * * * *